(12) United States Patent
Kim et al.

(10) Patent No.: US 7,999,421 B2
(45) Date of Patent: Aug. 16, 2011

(54) HORIZONTAL LINEAR VIBRATOR

(75) Inventors: Yong Jin Kim, Gyunggi-do (KR); Jun Kun Choi, Gyunggi-do (KR); Jae Woo Jun, Gyunggi-do (KR); Ki Suk Woo, Seoul (KR); Kwang Hyung Lee, Gyunggi-do (KR); Je Hyun Bang, Gyunggi-do (KR); Seok Jun Park, Gyunggi-do (KR); Kyung Ho Lee, Gyunggi-do (KR); Hwa Young Oh, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 151 days.

(21) Appl. No.: 12/559,461

(22) Filed: Sep. 14, 2009

(65) Prior Publication Data

US 2011/0018364 A1 Jan. 27, 2011

(30) Foreign Application Priority Data

Jul. 22, 2009 (KR) ........................ 10-2009-0066871

(51) Int. Cl.
*H02K 35/00* (2006.01)
(52) U.S. Cl. ........................ 310/15; 310/25; 310/17
(58) Field of Classification Search .................... 310/17, 310/15, 12.04, 25, 30
See application file for complete search history.

(56) References Cited

U.S. PATENT DOCUMENTS

| 7,671,493 | B2 * | 3/2010 | Takashima et al. | ............. 310/15 |
| 2004/0150277 | A1 * | 8/2004 | Moriyasu | ........................ 310/81 |
| 2010/0045118 | A1 * | 2/2010 | Hamura et al. | ................. 310/17 |

* cited by examiner

*Primary Examiner* — Nguyen N Hanh
(74) *Attorney, Agent, or Firm* — Blakely, Sokoloff, Taylor & Zafman, LLP

(57) ABSTRACT

The present invention provides a horizontal linear vibrator which can reduce the thickness but increase the strength of vibrations while at the same time guaranteeing a sufficiently long lifetime and satisfactory responsivity. The horizontal linear vibrator includes a casing, a bracket, a vibration unit and springs. The casing defines an internal space therein. A first magnet is attached to an upper plate of the casing. The bracket is coupled to the lower end of the casing. The second magnet is attached to the bracket such that different poles of the first and second magnets face each other. The vibration unit has a weight, and a cylindrical coil which is provided in or under the weight. The springs are coupled to the sidewall plates of the casing or the bracket. The springs elastically support the vibration unit to allow the vibration unit to vibrate in the horizontal direction.

12 Claims, 5 Drawing Sheets

HORIZONTAL LINEAR VIBRATOR

CROSS REFERENCE TO RELATED APPLICATION

This application claims the benefit of Korean Patent Application No. 10-2009-0066871, filed Jul. 22, 2009, entitled "HORIZONTAL LINEAR VIBRATOR", which is hereby incorporated by reference in its entirety into this application.

BACKGROUND OF THE INVENTION

1. Technical Field

The present invention relates to a horizontal linear vibrator.

2. Description of the Related Art

Generally, portable electronic devices, such as mobile phones, game players, mobile information terminals, etc., have various vibration generating units to prevent noise therefrom from disturbing other people. Particularly, such a vibration generating unit is installed in a cellular phone and used as a mute signal reception indicating unit. Recently, in accordance with the trend to provide a small and slim cellular phone, a reduction in the size and an increase in the function of a vibration generating unit installed in the cellular phone are also required.

At present, a vibration generating unit which is one of several signal reception indicating units used in a communication device, such as a cellular phone, converts electric energy into mechanical vibration by the use of a principle of generating electromagnetic force. That is, the vibration generating unit is used as a mute signal reception indicating unit in the cellular phone.

Meanwhile, a method in which mechanical vibration is generated by rotating a rotor having an eccentric weight has been used as a representative example of methods of operating vibration generating units according to conventional techniques. The rotation of the rotor is implemented by a commutator or brush motor structure which commutates currents through a contact point between the brush and the commutator and then supplies the currents to a coil of the rotor.

However, in the vibration generating unit having such a structure, when the brush passes through a gap between segments of the commutator, mechanical friction, electric sparks or abrasion is induced, thus creating impurities, such as black powder, thereby reducing the lifetime of the vibration generating unit. A vertical linear vibrator was proposed to overcome these problems, and representative examples of which can produce reliable linear vibration.

FIG. 1 is a sectional view of a vertical linear vibrator according to a conventional art.

As shown in FIG. 1, the vertical linear vibrator 10 according to the conventional art includes a casing 20, a bracket 30, a vibration unit 40 and a spring 50. The casing 20 defines a space therein. The bracket 30 supports thereon a coil 32 which forms a magnetic field using an electric current applied to the coil 32. A damper 34 is provided on the bracket 30. The vibration unit 40 includes a yoke 42 which has a hollow space therein and is closed on one end thereof, a magnet 44 which is installed in the hollow space of the yoke 42 and provided with a plate yoke 43 attached to the lower surface thereof, and a weight 46 which is fitted over the circumferential surface of the yoke 42. The spring 50 is coupled to the upper surface of the casing 20 to elastically support the vibration unit 40 such that it linearly vibrates. The yoke 42 includes a disk part 42*a* and a rim part 42*b* which is bent downwards from the outer edge of the disk part 42*a* and extends a predetermined length.

In the vertical linear vibrator 10 having the above-mentioned construction, when power is applied to the coil 32, the vibration unit 40 vibrates upwards and downwards by the spring 50 due to interaction between a magnetic field which is generated by a magnetic circuit including the cylindrical magnet 44, the plate yoke 43 and the yoke 42, and an electric field generated by the coil 32.

However, in the vertical linear vibrator 10, because the vibration quantity is proportional to a value obtained by multiplying the weight of the vibration unit 40 by a displacement thereof, the weight or displacement of the vibration unit 40 must be increased to ensure sufficient vibration quantity. This induces a disadvantage of the vertical linear vibrator 10 being increased in thickness. Furthermore, this structure cannot conform to the trend of small and slim cellular phones.

SUMMARY OF THE INVENTION

The present invention has been made in an effort to provide a horizontal linear vibrator which can reduce the thickness but increase vibration strength while at the same time guaranteeing a sufficiently long lifetime and satisfactory responsivity.

In a horizontal linear vibrator according to an embodiment of the present invention, a casing defines an internal space therein. A first magnet is attached to an upper plate of the casing. A bracket is coupled to a lower end of the casing. A second magnet is attached to the bracket such that different poles of the first magnet and the second magnet face each other. A vibration unit has a weight and a cylindrical coil provided in or under the weight. Springs are coupled to sidewall plates of the casing or the bracket. The springs elastically support the vibration unit to allow the vibration unit to vibrate in the horizontal direction.

In the horizontal linear vibrator, a damper may be provided on the sidewall plates of the casing or the bracket to prevent the vibration unit from coming into direct contact with the casing or the bracket.

Each of the first and second magnets may comprise a plurality of magnets arranged such that different poles thereof are disposed on a same plane.

In the horizontal linear vibrator, a circuit board may be provided on an upper surface of the bracket.

The circuit board may have an opening for receiving the second magnet therein.

Furthermore, plates may be provided on both sidewall plates of the weight. The plates may fasten corresponding ends of the springs to the weight.

The weight may have in an upper surface thereof a recess having a size capable of receiving the first magnet therein.

The casing and the bracket may be made of magnetic bodies.

The cylindrical coil may be mounted to the weight such that a center axis of the cylindrical coil is perpendicular to a horizontal direction of the vibration unit.

Each of the springs may comprise a coil spring or a plate spring.

In addition, magnetic flux formed between the first magnet and the second magnet may be perpendicular to a direction in which currents flows along the cylindrical coil.

As well, magnetic fluid may be applied to the first magnet, the second magnet or the springs.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
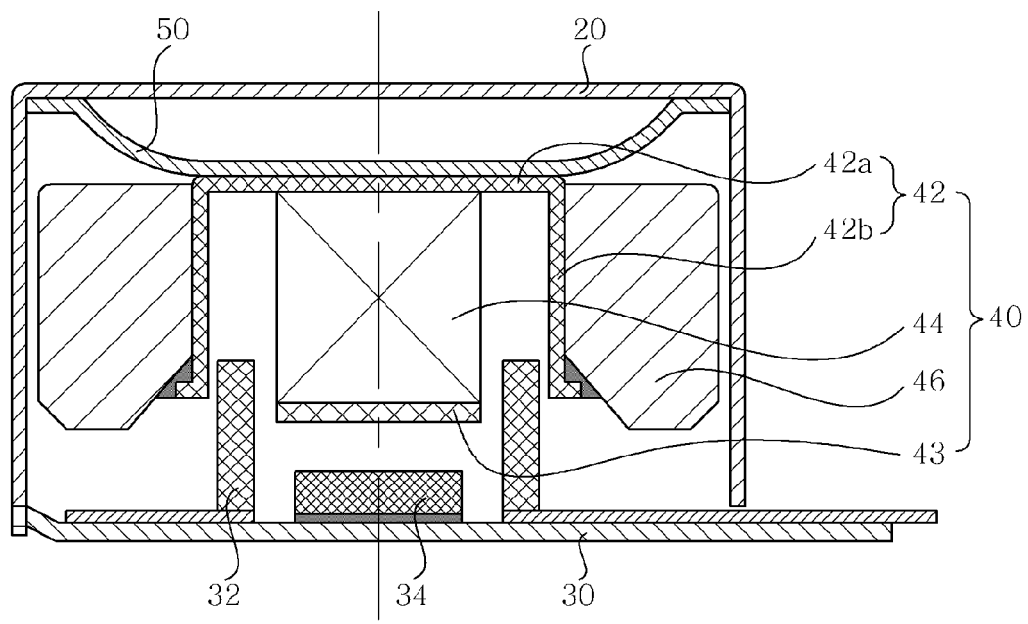
FIG. 1 is a sectional view showing a linear vibrator, according to a conventional art.

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Hereinafter, an embodiment of the present invention will be described in detail with reference to the attached drawings.

Figure 2:
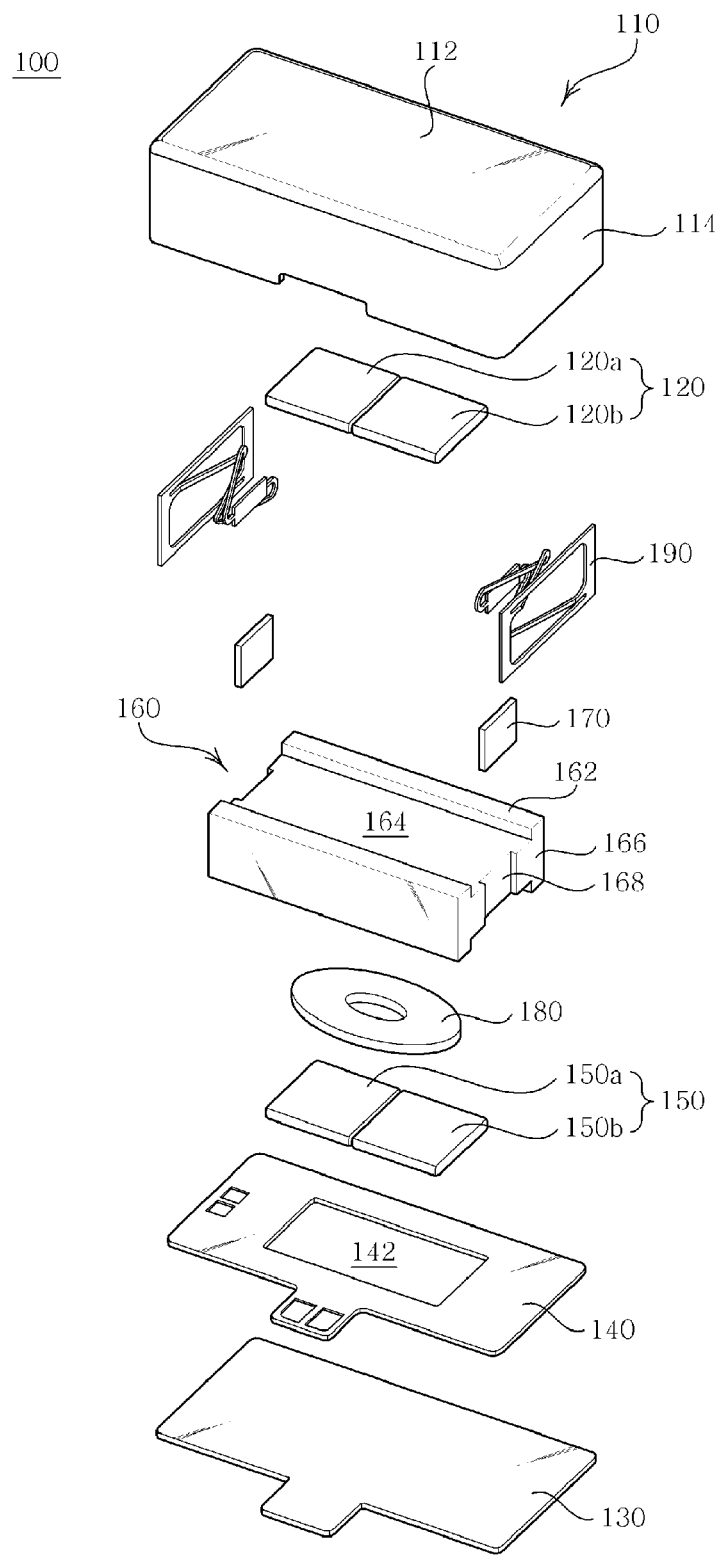
FIG. 2 is an exploded perspective view of a horizontal linear vibrator, according to an embodiment of the present invention.
Figure 3:
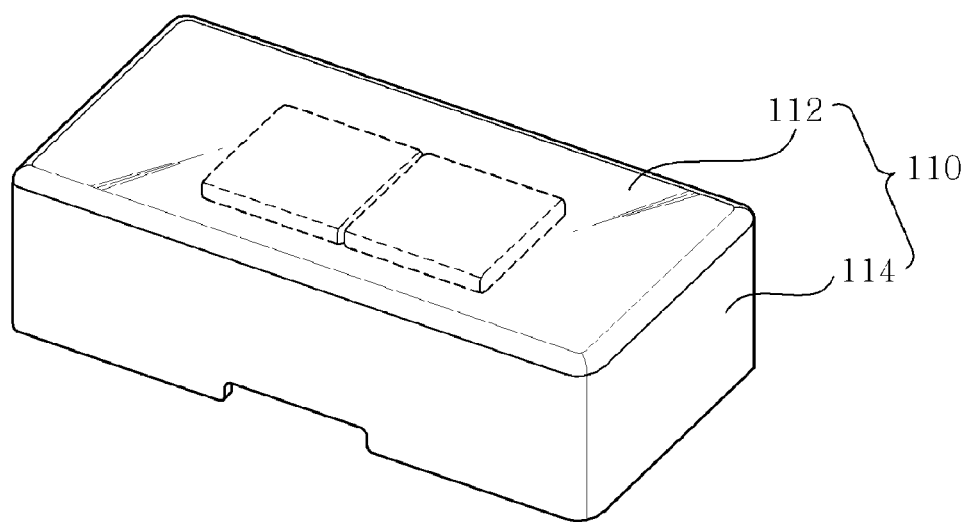
FIG. 3 is an assembled perspective view showing a casing and a first magnet according to the embodiment of the present invention.
Figure 4:
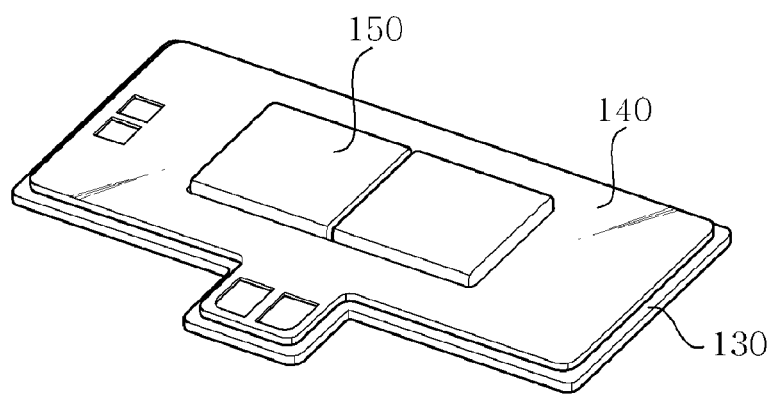
FIG. 4 is an assembled perspective view showing a bracket, a circuit board and a second magnet according to the embodiment of the present invention.
Figure 5:
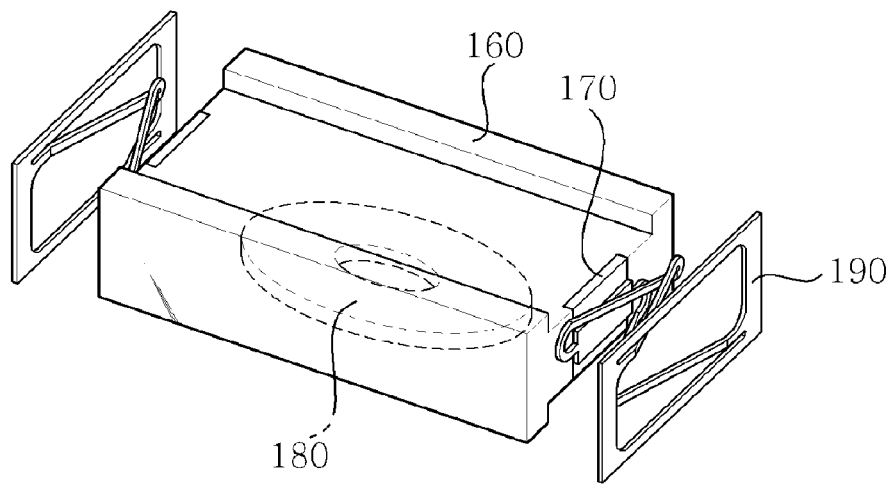
FIG. 5 is an assembled perspective view showing a vibration unit and springs according to the embodiment of the present invention.
Figure 6:
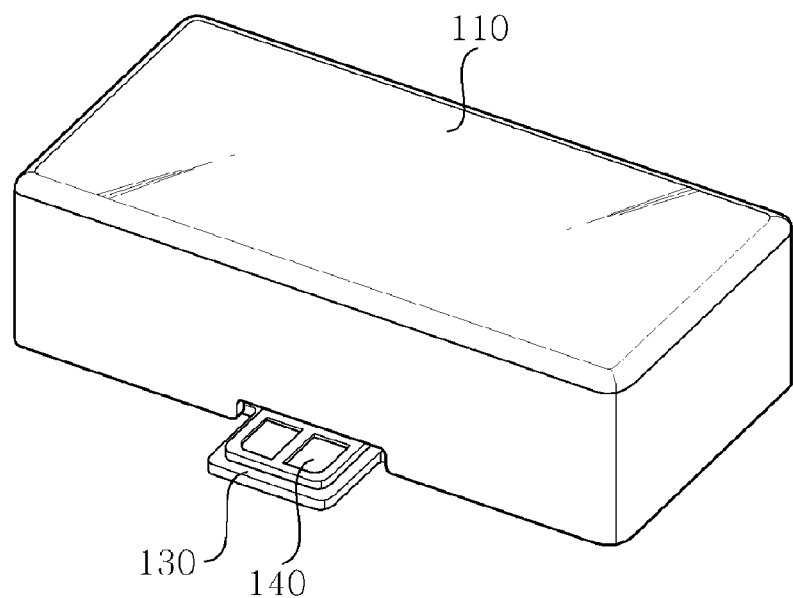
FIG. 6 is a perspective view of the assembled horizontal linear vibrator according to the embodiment of the present invention.

FIG. 2 is an exploded perspective view of a horizontal linear vibrator 100, according to an embodiment of the present invention. FIG. 3 is an assembled perspective view showing a casing 110 and a first magnet 120 according to the embodiment of the present invention. FIG. 4 is an assembled perspective view showing a bracket 130, a circuit board 140 and a second magnet 150 according to the embodiment of the present invention. FIG. 5 is an assembled perspective view showing a vibration unit and springs 190 according to the embodiment of the present invention. FIG. 6 is a perspective view of the assembled horizontal linear vibrator 100 according to the embodiment of the present invention. The horizontal linear vibrator 100 according to the embodiment will be described in detail with reference to these drawings.

As shown in FIGS. 2 through 6, the horizontal linear vibrator 100 of the present invention includes the casing 110, the bracket 130, the vibration unit and the springs 190.

The casing 110 protects the horizontal linear vibrator 100 from the outside and provides space for the vibration unit to be displaced and to vibrate in the horizontal direction. That is, the casing 110 is a member providing an internal space for the horizontal linear vibrator 100. In detail, the internal space is defined by the assembly of the casing 110 and the bracket 130.

The casing 110 may have any structure, so long as it forms an internal space when it is assembled with the bracket 120.

Preferably, the casing 110 has a rectangular structure whose longitudinal length (the direction in which the vibration unit horizontally vibrates) is longer than that in the lateral direction, so that the horizontal displacement space of the vibration unit can be sufficiently guaranteed.

In this embodiment, the casing 110 includes an upper plate 112 and sidewall plates 114 which are bent perpendicularly down from the edges of the upper plate 112. The sidewall plates 114 include longitudinal side plates which extend in the longitudinal direction of the casing 110, and lateral side plates which extend in the lateral direction of the casing 110.

The first magnet 120 is attached to the lower surface of the upper plate 112 of the casing 110 using a bonding agent (refer to FIG. 3). The first magnet 120 generates a magnetic field of a predetermined magnitude and thus linearly vibrates the vibration unit using reciprocal action between it and a cylindrical coil 180.

Here, the first magnet 120 is disposed above the second magnet 150 attached to the bracket 130, and the first and second magnets 120 and 150 are oriented such that different poles thereof face each other in the vertical direction. The first magnet 120 preferably comprises a plurality of first magnets such that a relatively large horizontal displacement can be obtained without increasing the thickness. In this case, to increase magnetic force which links with the cylindrical coil 180, the first magnets 120 are disposed such that different poles thereof are placed on the same plane. This will be explained in more detail when describing FIG. 7 which illustrates the principle of the operation of the horizontal linear vibrator of the present invention.

Meanwhile, a damper (not shown) may be provided on sidewall plates 114 of the casing 110 to absorb shock applied to the vibration unit and prevent the vibration unit from coming into direct contact with the casing 110 when the vibration unit horizontally vibrates. A variety of materials which are capable of absorbing shocks, such as rubber, polypropylene, magnetic fluid, etc., can be used as the material for the damper.

Here, the magnetic fluid is formed in such a way that magnetic powder is stably and evenly dispersed in liquid to have a colloidal shape and a surface active agent is added to the liquid to prevent deposition or agglutination of the magnetic powder attributable to gravity or the magnetic field. For example, magnetic fluid formed by dispersing triiron tetroxide or iron-cobalt alloy particles in oil or water is used, and, recently, magnetic fluid formed by dispersing cobalt in toluene is being used. Such magnetic powder is an ultrafine particle powder ranging from 0.01 μM to 0.02 μM and moves under Brownian motion that is one of the specific characteristics of ultrafine particles. In addition, the magnetic fluid is characterized in that even if an external magnetic field, gravity, centrifugal force, etc. is applied thereto, the density of magnetic powder particles in the fluid remains constant.

The bracket 130 is coupled to the lower end of the casing 110 to define the internal space. Furthermore, the bracket 130 provides space for mounting the circuit board 140 and the second magnet 150.

In detail, the bracket 130 has a planar shape and covers the open lower end of the casing 110. However, the configuration of the casing 110 and the bracket 130 shown in FIG. 2 is only one example of the structure in which the casing 110 may be assembled with the bracket 130 to form the internal space in which the vibration unit vibrates. For example, alternatively, the casing 110 and the bracket 130 may be configured such that the casing 110 has a planar shape while the bracket 130 has a rectangular box shape which is open on the upper end thereof. As well, those skilled in this art will easily understand that the configuration of the casing 110 and the bracket 130 can be variously modified.

The circuit board 140 having a pattern thereon is provided on the upper surface of the bracket 130 (refer to FIG. 4). The circuit board 140 is connected to an external input terminal to transmit power to the cylindrical coil 180. Preferably, the circuit board 140 has therein an opening 142 for receiving the second magnet 150. In FIG. 2, although the circuit board 140 has been illustrated as being provided separately from the bracket 130, they may be integrally formed into a single body using the same material. This can also fall within the bounds of the present invention.

Furthermore, the second magnet 150 is attached to the upper surface of the bracket 130 (refer to FIG. 4). The second magnet 150 generates a magnetic field of a predetermined magnitude and thus linearly vibrates the vibration unit using reciprocal action between it and the cylindrical coil 180. As stated above, the second magnet 150 is disposed such that the poles of the second magnet 150 face the opposite poles of the first magnet 120 in the vertical direction. The number of second magnets 150 corresponding to the number of the first magnets 120 is attached to the upper surface of the bracket 130 by bonding. Preferably, magnetic fluid may be applied to the first magnet 120 and/or the second magnet 150.

In this embodiment, the first magnets 120 and the second magnets 150 are respectively attached to the casing 110 and the bracket 130. The casing 110 and the bracket 130 which are made of magnetic bodies function as a yoke for preventing the leakage of magnetic force generated from the first and second magnets 120 and the 150. Due to this structure, a separate yoke is not required in the internal space formed by the casing 110 and the bracket 130.

Furthermore, in this embodiment, the first magnets 120 and the second magnets 150 which are attached to the casing 110 and the bracket 130 do not constitute the vibration unit. Therefore, the present invention can avoid a problem of the vibration unit sagging downwards under magnetic attractive force applied to the casing 110 and the bracket 130 when the vibration unit has the structure including the first magnets and the second magnets.

The vibration unit includes a weight 160 and the cylindrical coil 180 and linearly vibrates in the horizontal direction.

The weight 160 functions to apply a predetermined weight to the vibration unit to generate appropriate vibrational force. The weight 160 has therein or in the lower surface thereof a space for mounting the cylindrical coil 180.

In this embodiment, the weight 160 includes an upper plate 162 and sidewall plates 166 which are bent downwards from the edges of the upper plate 162. The sidewall plates 166 include longitudinal side plates which extend in the longitudinal direction of the weight 160, and lateral side plates which extend in the lateral direction of the weight 160.

Furthermore, plates 170 are provided on the sidewall plates 166 of the weight 160. The plates 170 function to couple the corresponding ends of the springs 190 to the weight 160. In detail, guide depressions 168 are respectively formed in the sidewall plates 166 of the weight 160. The plates 170 are respectively inserted into the guide depressions 168. The plates 170 are fastened to the inner end of the corresponding spring 190.

In addition, the weight 160 has on the upper surface thereof a recess (concave portion) 164 having a size capable of receiving the first magnets 120 therein. Thus, even if the vibration unit undesirably moves in the vertical direction because of an external force, because the first magnets 120 can enter the recess 164 of the weight 160, the weight 160 can be prevented from coming into direct contact with the first magnets 120. Moreover, due to such a structure, the thickness of the horizontal linear vibrator 100 can be minimized.

The cylindrical coil 180 generates an electric field of a predetermined intensity when external power is applied thereto. The cylindrical coil 180 is installed in or under the weight 160. In detail, the cylindrical coil 180 is coupled to the weight 160 such that the center axis thereof is perpendicular to the horizontal vibration direction of the vibration unit, in other words, the center axis is oriented in the vertical direction.

The cylindrical coil 180 is disposed between the first magnets 120 and the second magnets 150. Magnetic flux formed between the first magnet 120 and the second magnet 150 is perpendicular to the direction in which currents flow through the cylindrical coil 180, thus forming a closed magnetic circuit. Thereby, the vibration unit can vibrate in the horizontal direction. The operation of the vibration unit will be explained in more detail in the description of FIG. 7.

The springs 190 elastically support (provide elastic restoring force to) the vibration unit such that the vibration unit linearly vibrates. The springs 190 are coupled at the inner ends thereof to the weight 160 of the vibration unit and coupled at the outer ends thereof to the sidewall plates 114 of the casing 110 to elastically support the vibration unit.

A plate spring or a coil spring can be used as each spring 190. Preferably, the springs 190 are provided on both ends of the vibration unit to have a symmetrical structure. For the sake of illustration of the present invention, plate springs are illustrated in the drawings as being used as the springs 190.

Figure 7:
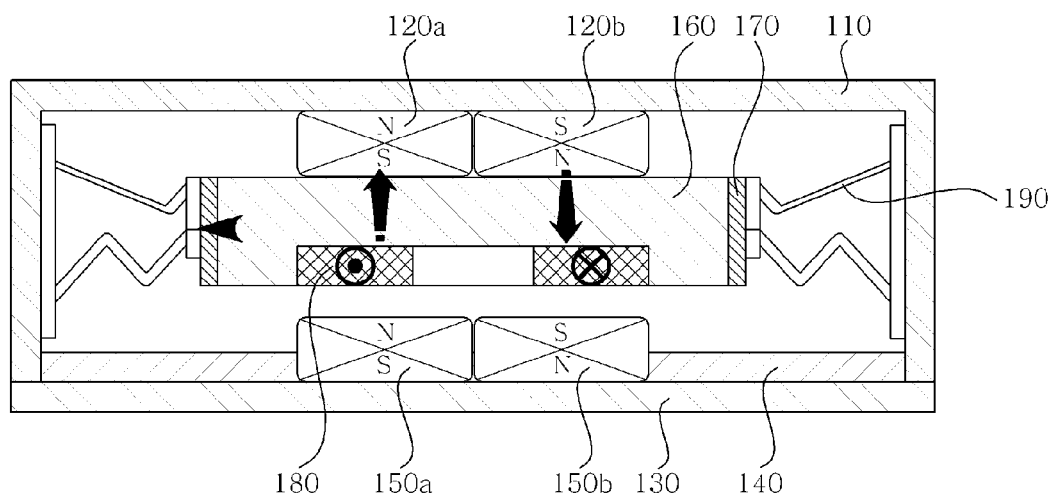
FIG. 7 is a view illustrating the principle of operation of the horizontal linear vibrator according to the embodiment of the present invention.

FIG. 7 is a view illustrating the principle of operation of the horizontal linear vibrator 100 according to the embodiment of the present invention. Although FIG. 7 shows one example for illustrating the operating principle of the horizontal linear vibrator 100, the present invention is not limited to this example. The principle of the operation of the horizontal linear vibrator 100 according to the embodiment of the present invention will be explained with reference to FIG. 7.

As shown in FIG. 7, the first magnets 120 including the left first magnet 120a and the right first magnet 120b are attached to the casing 110 such that different poles thereof are placed on the same plane. The second magnets 150 including the left second magnet 150a and the right second magnet 150b are attached to the bracket 130 such that different poles between the first magnets 120 and the second magnets 150 face each other. Here, when the first magnets 120 and the second magnets 150 are disposed such that the poles thereof are oriented as expressed in the drawings, magnetic flux flowing upwards is formed between the left first magnet 120a and the left second magnet 150a, and magnetic flux flowing downwards is formed between the right first magnet 120b and the right second magnet 150b. In the case where current flows through the cylindrical coil 180 between the left first magnet 120a and the left second magnet 150a in the direction in which it flows out from the surface of the drawing, force is applied to the vibration unit to the left by Fleming's left hand rule. Simultaneously, current flows through the cylindrical coil 180 between the right first magnet 120b and the right second magnet 150b in the direction in which it enters the surface of the drawing, so that force is also applied to the vibration unit to the left by Fleming's left hand rule.

Thereby, the vibration unit which is elastically supported by the springs 190 vibrates in the horizontal direction. Furthermore, the direction of force applied to the vibration unit may be varied by changing the directions of the magnetic poles of the first and second magnets 120 and 150 or the direction in which current flows through the cylindrical coil 180. This modification should be regarded as falling within the bounds of the above operating principle of the horizontal linear vibrator.

As described above, in a horizontal linear vibrator according to the present invention, a vibration unit vibrates in the horizontal direction. Therefore, the present invention does not require space for vertical motion displacement of the vibration unit, thus reducing the thickness of the horizontal linear vibrator.

Furthermore, the present invention is designed such that the horizontal linear vibrator extends a predetermined length in the horizontal direction which is the direction in which the vibration unit vibrates. Hence, sufficient vibrational displacement of the vibration unit can be ensured in the horizontal direction, thus increasing the quantity of vibration.

In addition, because magnets are fastened to a casing and a bracket, linear vibration of the vibration unit is prevented from being disturbed by magnetic force, and the vibration is prevented from undesirably sagging to one side.

Moreover, in the present invention, the magnets are fastened to the casing and the bracket which are made of magnetic bodies. Therefore, the casing and the bracket prevent the leakage of magnetic force generated from the magnets, so that a separate yoke is not required.

Although the embodiment of the present invention has been disclosed for illustrative purposes, it will be appreciated that a horizontal linear vibrator according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A horizontal linear vibrator, comprising:
  a casing defining an internal space therein, with a first magnet attached to an upper plate of the casing;
  a bracket coupled to a lower end of the casing, with a second magnet attached to the bracket such that different poles of the first magnet and the second magnet face each other;
  a vibration unit having a weight, and a cylindrical coil provided in or under the weight; and
  springs coupled to sidewall plates of the casing or the bracket, the springs elastically supporting the vibration unit to allow the vibration unit to vibrate in the horizontal direction.

2. The horizontal linear vibrator as set forth in claim 1, further comprising:
  a damper provided on the sidewall plates of the casing or the bracket to prevent the vibration unit from coming into direct contact with the casing or the bracket.

3. The horizontal linear vibrator as set forth in claim 1, wherein each of the first and second magnets comprises a plurality of magnets arranged such that different poles thereof are disposed on a same plane.

4. The horizontal linear vibrator as set forth in claim 1, further comprising:
  a circuit board provided on an upper surface of the bracket.

5. The horizontal linear vibrator as set forth in claim 4, wherein the circuit board has an opening for receiving the second magnet therein.

6. The horizontal linear vibrator as set forth in claim 1, wherein plates are provided on both sidewall plates of the weight, the plates fastening corresponding ends of the springs to the weight.

7. The horizontal linear vibrator as set forth in claim 1, wherein the weight has in an upper surface thereof a recess having a size capable of receiving the first magnet therein.

8. The horizontal linear vibrator as set forth in claim 1, wherein the casing and the bracket are made of magnetic bodies.

9. The horizontal linear vibrator as set forth in claim 1, wherein the cylindrical coil is mounted to the weight such that a center axis of the cylindrical coil is perpendicular to a horizontal direction of the vibration unit.

10. The horizontal linear vibrator as set forth in claim 1, wherein each of the springs comprises a coil spring or a plate spring.

11. The horizontal linear vibrator as set forth in claim 1, wherein magnetic flux formed between the first magnet and the second magnet is perpendicular to a direction in which currents flows along the cylindrical coil.

12. The horizontal linear vibrator as set forth in claim 1, wherein magnetic fluid is applied to the first magnet, the second magnet or the springs.

* * * * *